United States Patent [19]

Stading

[11] 4,364,161
[45] Dec. 21, 1982

[54] METHOD OF FABRICATING A HIGH PRESSURE TANK

[75] Inventor: Russell C. Stading, Elgin, Ill.

[73] Assignee: The Marison Company, South Elgin, Ill.

[21] Appl. No.: 221,168

[22] Filed: Dec. 29, 1980

[51] Int. Cl.³ .................... B23P 17/00; B23Q 17/00; B23K 31/00

[52] U.S. Cl. .................................... 29/407; 228/104; 228/155

[58] Field of Search ...................... 29/407, 446; 72/82, 72/83, 85; 73/49.3, 52, 587, 598, 801; 220/3; 228/103, 104, 155, 173 F; 413/1, 69

[56] References Cited

U.S. PATENT DOCUMENTS

| | | | |
|---|---|---|---|
| 1,977,987 | 10/1934 | Corby | 228/104 |
| 2,030,818 | 2/1936 | Harter | 29/407 |
| 2,273,736 | 2/1942 | Raymond et al. | 29/407 X |
| 2,346,423 | 4/1944 | Gray | 29/407 |
| 2,386,246 | 10/1945 | Mapes | 228/155 |
| 3,068,562 | 12/1962 | Long | 228/104 |
| 3,439,405 | 4/1969 | Berman et al. | 29/407 |
| 3,456,831 | 7/1969 | Johansson | 220/3 |

*Primary Examiner*—Ervin M. Combs

[57] ABSTRACT

A tank and method for fabricating the tank are disclosed wherein a longitudinally seam welded segment of a generally cylindrical steel tube is formed by hot spinning into a cylinder. The cylinder is heat treated, shot blasted, and non-destructively tested to verify that the heat treatment is uniform and proper, that the wall thickness is as desired, and that the weld region is acceptable with no critical defects created as a result of the hot spinning and heat treating. The cylinder is pressurized with air to a predetermined pressure to verify that there is no leakage from the spun closed end of the tank. Finally, the cylinder is hydrostatically tested to a predetermined pressure level with water and the cylinder weld is simultaneously examined by means of acoustic emission with the cylinder stressed in response to the internally applied hydrostatic test pressure to determine if a paste weld condition exists.

2 Claims, 4 Drawing Figures

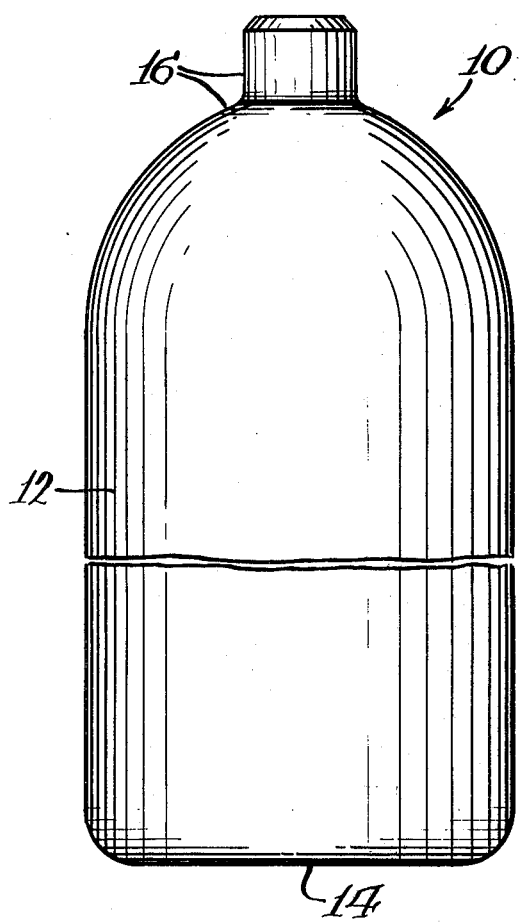
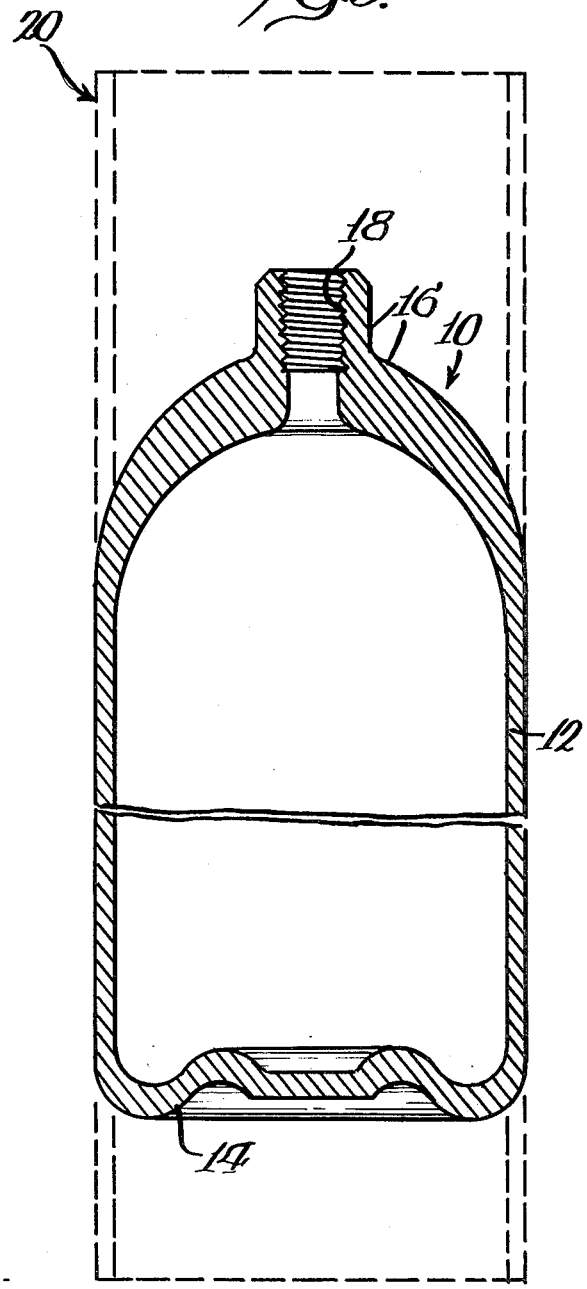
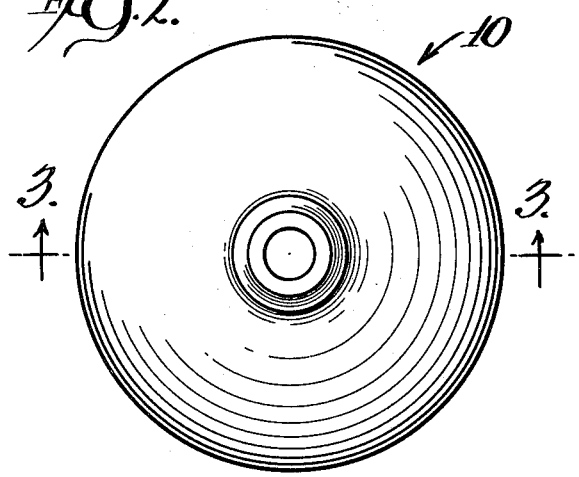

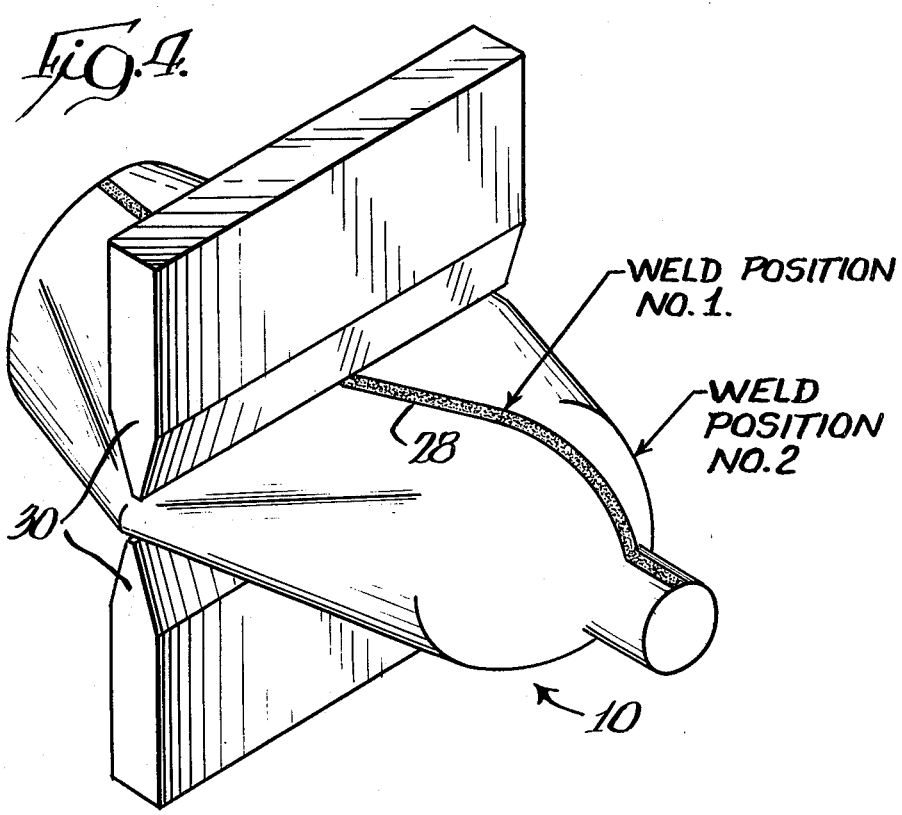

4,364,161

METHOD OF FABRICATING A HIGH PRESSURE TANK

DESCRIPTION

TECHNICAL FIELD OF THE INVENTION

This invention relates to a tank or vessel for containing gases compressed at high pressure, as well as to methods for fabricating and testing such a vessel to ensure the integrity of the vessel. In the pressure vessel manufacturing industry in the United States of America, such a vessel is commonly designated by the term "cylinder."

BACKGROUND OF THE INVENTION

Relatively thin-walled cylinders are typically produced by the conventional manufacturing operation known as spinning wherein a pipe section is placed in the hollow spindle of a lathe-type machine after having been heated and wherein the pipe section is spun about its longitudinal axis while a tool is fed against the pipe section to form the ends of the cylinder.

A cylinder for containing and transporting various gases at high pressures (e.g., 1800 to 3000 psig or higher) must have sufficient integrity to withstand the stresses of the pressurized gas contained within the cylinder. Further, any failures shall all be in the ductile mode and shall not cause the cylinder to fragment. In the United States of America, the Department of Transportation has promulgated specifications and regulations governing the manufacture and use of such high pressure cylinders.

Heretofore, the integrity of the high pressure cylinders and compliance with the Department of Transportation specifications could only be ensured with cylinders of seamless construction. The manufacture of seamless tube or pipe is well known and involves relatively expensive methods to produce a product that does not have a longitudinal seam. Examples of specifications governing the construction of seamless high pressure cylinders are the U.S. Dept. of Transportation specifications set forth in 49 CFR 178.36 and 49 CFR 178.37.

Although seamed pipe and tubing can be less espensively produced than seamless pipe or tubing, cylinders formed from seamed pipe or tubing must be carefully manufactured, examined, and tested to ensure their integrity. Typically, seamed pipe has the longitudinal seam formed by electric resistance welding. In high pressure applications, the welded seam must be free of critical defects that could lead to failure of the cylinder.

Heretofore, conventional manufacturing techniques for producing cylinders from electric resistance weld seamed pipe were not of a quality sufficient to lead to acceptance of such seamed cylinders for high pressure gas applications. Further, heretofore, examination and testing techniques had not been developed to the extent believed to be necessary to permit the use of a tested seamed cylinder in high pressure applications.

It would be desirable to provide a cylinder fabricated from electric resistance weld seamed pipe or tube for use in high pressure applications. Further, it would be desirable to provide methods for manufacturing, examining, and testing such a cylinder that would ensure the integrity of the cylinder with respect to use with high pressure gas.

SUMMARY OF THE INVENTION

In accordance with the teachings of the present invention, a cylinder with a longitudinal seam formed by electric resistance welding techniques is provided for high pressure applications. The cylinder is hot spun from seamed tubing.

In the preferred embodiment, the seamed tubing is subjected to inline ultrasonic inspections of the longitudinal seam weld. Additionally, the tubing is subjected to a flux leakage test over the entire circumference. Also, the tube is hydrostatically tested to ensure that the weld is sufficiently mechanically bonded.

Following conventional hot spinning of the tubing, the formed cylinder is heat treated and especially inspected to ensure that the heat treatment is uniform and proper, that the wall thickness is as desired, and that the weld region is acceptable with no critical defects created as a result of the hot spinning and heat treatment.

Conventional machining and cleaning operations are performed on the formed cylinder. Then, the tank is pressurized with air to verify that there is no leakage form the spun closed end of the cylinder. Further, the cylinder is hydrostatically tested to a predetermined pressure level while the cylinder weld is simultaneously examined by means of acoustic emission techniques. In this test, the cylinder is stressed to a level above the operating stress to determine if a paste weld condition exists.

Numerous other advantages and features of the present invention will become readily apparent from the following detailed description of the invention and preferred embodiment thereof, from the claims and from the accompanying drawings.

BRIEF DESCRIPTION OF THE DRAWINGS

In the accompanying drawings, forming part of the specification, and in which like numerals are employed to designate like parts throughout the same, FIG. 1 is a fragmentary side view of a cylinder fabricated in accordance with the teachings of the present invention;

FIG. 2 is a top view of the cylinder illustrated in FIG. 1;

FIG. 3 is a fragmentary, cross-sectional view taken generally along the plane 3—3 in FIG. 2; and FIG. 4 is a schematic diagram illustrating the flattening of a selected sample cylinder during a destructive examination of the weld zone.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

The precise shapes and sizes of the components herein described are not essential to the invention unless otherwise indicated. Unless otherwise indicated, the particular shapes and sizes are shown to best illustrate the principles of the invention.

In the following description, reference will be made to certain industry standards and codes. The standards and codes will be designated by their common initial letter designations as follows: AISI—American Iron and Steel Institute, 1000 16th St., N.W., Washington, D.C. U.S.A. 20036 and ASTM—American Society for Testing and Materials, 1916 Race St., Philadelphia, Pa., U.S.A. 19103. The designated codes and standards are those in effect on Oct. 24, 1980.

FIGS. 1, 2, and 3 illustrate a tank, vessel, or cylinder 10 for containing high pressure gases (e.g., 2,265 psig). The cylinder 10 has been formed from a length of welded metal tubing or pipe having a generally hollow cylindrical configuration.

The cylinder 10 includes a generally cylindrical sidewall 12, a base 14, and a neck 16. As best illustrated in FIG. 3, the neck 16 typically defines a tapped orifice 18 into which a suitable, conventional valve (not illustrated) may be threadingly inserted.

The cylinder 10 may be fabricated from a suitable metal. Acceptable cylinders may be made from strips of carbon-manganese steel (AISI 1536 or equivalent), chrome-moly steel (AISI 4130), or other high strength, low alloy grades of steel. Preferably, the type of steel selected for fabricating the cylinder is one that has good ductility and toughness at moderate strength levels (e.g., yield strength of 90,000 psi). Another important factor to consider in the selection of the metal used for fabricating the cylinder is that of the weldability of the metal.

The cylinder 10 is hot spun from seamed tubing or pipe. Preferably, a strip of hot rolled steel is first formed into a substantially closed curve configuration with the longitudinal margins thereof in an aligned and adjacent relationship. An electric resistance weld is effected along the margins to form a length or segment of seam welded tubing with plain ends that are then square cut. Such a tubing segment is shown in dashed lines in FIG. 3 and is designated therein generally by reference numeral 20.

It is important that the tubing 20 have no critical defects substantial enough to deleteriously affect the integrity of the cylinder 12 that is ultimately formed from the tubing 20. To this end, the tubing 20 is fabricated and furnished in accordance with a predetermined set of dimensions and tolerances, such as those set forth in ASTM A513, and is further examined and tested as explained in detail hereinafter.

To ensure that the material is as specified, the fabricator of the tubing is preferably required to provide certified test reports designating the metal chemistry and tensile test data.

The longitudinal electric resistance seam weld of the tubing segment is preferably flash controlled to −0.000″ +0.010″ without undercut and is normalized.

In addition, the welded tubing segment is preferably 100 percent inline ultrasonically inspected. The ultrasonic inspection is performed in accordance with ASTM E273 with calibration samples having 5 percent wall thickness defects or 10 percent wall thickness defects prepared as specified in ASTM E273.

After the tubing is finally formed to the desired diameter, a 100 percent flux leakage test is preferably performed on the entire circumference of the tubing or pipe segment. The flux leakage test is performed in accordance with ASTM E570 with calibration samples having 5 percent wall thickness defects or 10 percent wall thickness defects prepared as specified in ASTM E570.

The above-discussed ultrasonic and flux leakage testing are callibrated and no critical defect greater than 10 percent, and preferably 5 percent, of the wall thickness is permitted. Tubing not passing the test is rejected.

The tubing segment preferably then receives a 100 percent hydrostatic test for a duration of 15 seconds to provide assurance that the weld is sufficiently mechanically bonded. The hydrostatic test pressurizes the tube, as fabricated, to a stress level equal to 80 percent of the guaranteed minimum yield strength for the material grade. Any tube that leaks or ruptures during the 15 second pressurization is rejected.

Following the hydrostatic test, the tubing is cut to the desired length for the specific size cylinder to be fabricated. The cut lengths are inspected on both the inside and outside diameters at the weld area for defects. Any cut lengths having critical defects at the weld area are rejected.

An acceptable cut length of the tubing is then hot spun to form the above-described cylinder 10 in accordance with conventional hot spinning techniques.

Following the formation of the cylinder 10 by hot spinning, the bottom 14 of the cylinder 10 is preferably visually inspected at the inside diameter and at the outside diameter for weld zone continuity. Any formed cylinder with an unacceptable critical defect is rejected.

The formed cylinder is then heat treated in a particular manner dependent upon the cylinder design and material grade. However, the following treatment, as generally described, is performed on all cylinders.

First the cylinder is heated to a temperature of the material upper critical temperature (AC3). The cylinder is then quenched in a suitable medium, such as oil or other fluid that has a cooling rate for the cylinder material that does not exceed 80 percent of the cooling rate with water. The cylinder is then tempered by a suitable conventional process so as to produce the specified values for the mechanical properties of ultimate strength, yield strength, and elongation and reduction in area.

Preferably, a number of cylinders are destructively examined. First, one cylinder is selected from each heat treatment lot. The complete cylinder or cylinder section of a length not less than twice the outside diameter is flattened across the weld zone 28 between two members 30 by conventional techniques with the weld zone 28 at the bend knuckle designated by the arrow labeled "WELD POSITION NO. 1" in FIG. 4. If the cylinder cracks when flattened to six times the average wall thickness, the entire lot is rejected.

Another cylinder of the same heat treatment lot is also selected. The complete cylinder or cylinder section of a length not less than twice the outside diameter is flattened by conventional techniques with the weld zone at 90 degrees from the bend knuckle. With reference to FIG. 4, the cylinder would be rotated so that the weld zone would be 90 degrees from the weld zone 28 at a position designated by the arrow labeled "WELD POSITION NO. 2."

One cylinder from every 200 cylinders that are heat treated will be selected for providing tensile specimens and a metallographic examination sample. Two tensile specimens are taken 180 degrees apart from the center section of the cylinder in regions free of the weld zone and are tested in accordance with the U.S. Dept. of Transportation specifications set forth in 49 CFR 178.37-16. Failure is cause for lot rejection. However, the lot may be reheat treated and retested once.

The examination sample is taken from the weld zone and is inspected for uniform grain section, inclusions, voids, and lack of fusion. Presence of defects is cause for lot rejection.

Following heat treating, the exterior surface of the formed cylinder is preferably properly prepared by subjecting it to conventional shot blasting to remove heat treatment scale and produce a compressive residual stress in the outer fibers of the cylinder.

After ensuring that the cylinder is clean and free of scale, it is preferably non-destructively tested with ultrasonic and/or eddy current techniques as discussed below to verify that the wall thickness is as desired, that the heat treatment is uniform and proper, and that the weld region continues to be acceptable with no critical defects created as a result of the hot spinning and the heat treating.

First, the minimum wall thickness of the cylinder is calibrated. This, of course, depends on the particular design and is specified by the applicable code. Any cylinder not having that required wall thickness is rejected.

Second, uniformity of heat treatment is tested. Cylinders for which the test indicates non-uniform heat treatment are rejected.

Third, the weld region of each cylinder is inspected for defects to 5 percent of the wall thickness. Cylinders showing such defects are manually inspected to evaluate the individual defect areas for the length of the defect.

The formed cylinder is then machined to spot face the neck end and face the neck to length. The diameter is then turned for the neckring.

The neck orifice 18 is then completed by predrilling a hole, core drilling a bore, and then tapping the bore. The orifice 18 is checked for proper length and threading.

The formed cylinder is then cleaned and dried. This may, for small cylinders (e.g., less than 800 cubic inches internal volume), include alkaline cleaning and iron phosphating. Larger cylinders may be steam cleaned by conventional techniques. Preferably, the cylinder is inverted and steam is introduced to the inside of the cylinder until the inside of the cylinder is clean and hot for a period of approximately two to three minutes. This cylinder is removed and the inside is vacuumed clean and dry in accordance with conventional techniques.

Preferably, after cleaning, the formed cylinder is weighed.

Preferably, an air test is next performed on the cylinder. The cylinder is positioned in a conventional air test jacket and pressurized for sixty seconds with air to a predetermined test pressure to verify that there is no leakage from the spun closed end of the cylinder. The exterior bottom surface of each cylinder is covered with a soap solution. In the U.S.A., this test is witnessed by a Dept. of Transportation inspector.

Preferably, a hydrostatic test is next performed on the cylinder. The cylinder is filled with water and the test fitting with cover plate is threaded into the open end of the cylinder. The cylinder is then lowered into the test jacket and clamped in place. The water within the cylinder is subjected to the desired test pressure for a period of thirty seconds. The test is performed at a stress level above the operating stress level in accordance with the U.S. Dept. of Transportation specifications set forth in 49 CFR 178.37. Specifically, the test pressure is five thirds of the service pressure. The cylinder deflection is measured as set forth in the Compressed Gas Association Pamphlet C-1, "Method of Hydrostatic Testing," 500 Fifth Avenue, New York, N.Y. 10036, U.S.A.

During the hydrostatic test, an acoustic emission test of the cylinder is simultaneously performed to determine the existence of any unacceptable paste weld or cold weld condition. If the test generates acoustic emission events exceeding a certain level, the cylinder is rejected. The acoustic emission and hydrostatic test of each cylinder is witnessed in the U.S.A. by a Dept. of Transportation inspector.

For cylinders subject to use under regulations promulgated in the U.S.A. by the Dept. of Transportation, the required information is stamped on the cylinder. Following this, a neckring is installed, when required, and metal is uniformly peened over the neckring to secure it. The threads are gauged and retapped if needed.

The cylinder is then given a final cleaning and is dried. The cleaning techniques that have been previously described may be used.

Following the final cleaning, the cylinder may be plugged and painted as desired.

The above-described manufacturing process and testing sequence assures the integrity of the cylinder and its capability to withstand the stresses created when the tank is filled with high pressure gas to the design pressure. Such a cylinder may thus be safely used to contain and transport high pressure gases, the cylinder having been fabricated in a less expensive manner with electric resistance weld seamed tubing.

From the foregoing, it will be observed that numerous variations and modifications may be effected without departing from the true spirit and scope of the novel concept of the invention. It is to be understood that no limitation with respect to the specific structure and methods disclosed herein is intended or should be inferred. It is, of course, intended to cover by the appended claims all such modifications as fall within the scope of the claims.

What is claimed is:

1. A method of fabricating and testing a tank for storing and transporting high pressure gases comprising the following steps:
   (a) providing a steel strip formed into a substantially closed curve configuration with the longitudinal margins thereof in an aligned and adjacent relationship and effecting an electrical resistance seam weld along said adjacent margins to form a length of seam welded tubing;
   (b) ultrasonically examining the weld region of the tubing for voids and lack of fusion to 5 percent of the tubing thickness;
   (c) effecting a final forming of the tubing to a desired diameter and then subjecting the circumference of the finally formed tubing to a flux leakage test for flaws and critical defects;
   (d) hydrostatically testing said tubing for paste-welding;
   (e) hot spinning the finally formed tubing to form a tank with a cylindrical sidewall, a bottom, and a neck;
   (f) heat treating said tank;
   (g) shot blasting said tank;
   (h) non-destructively testing said tank with ultrasonic and eddy current techniques to verify that the heat treatment is uniform and proper, that the wall thickness is as desired, and that the weld region continues to be acceptable with no critical defects created as a result of said hot spinning and said heat treating;

(i) spot facing the neck end of the tank, facing the neck to the desired length, turning the diameter for the neck ring when required, predrilling a hole through the neck, core drilling a bore in the neck for subsequent tapping, and tapping the formed bore;

(j) discharging steam into the tank with the tank in inverted position until the inside of the tank is clean and hot;

(k) vacuuming the inside of the tank until it is clean and dry;

(l) pressurizing the tank with air to a predetermined pressure to verify that there is no leakage from the spun closed end of the tank; and (m) hydrostatically testing the tank to a predetermined pressure level with water and simultaneously examining the tank weld by means of acoustic emission with the tank stressed in response to the internally applied hydrostatic test pressure to determine if a paste weld condition exists.

2. A method for making and testing a tank suitable for use in storing and transporting gases at pressures at or above about 1800 psig, said method comprising at least the following steps:

(a) providing a length of welded steel tubing having a generally hollow cylindrical configuration which includes a generally linear weld region;

(b) hot spinning the tubing and forming said tubing into a tank having a bottom, a cylindrical sidewall, and a neck;

(c) heat treating said formed tank;

(d) non-destructively testing said tank with ultrasonic and eddy current techniques to verify that the heat treatment is uniform and proper, that the wall thickness is as desired, and that said weld region continues to be acceptable with no critical defects created as a result of said hot spinning and said heat treating; and (e) hydrostatically testing the tank to a predetermined pressure level with liquid in accordance with applicable codes and simultaneously examining the tank weld by means of acoustic emission with the tank stressed in response to the internally applied hydrostatic test pressure to determine if a paste weld condition exists.

* * * * *